Sept. 13, 1932.   H. C. FIELD   1,877,289
HANDLE ASSEMBLY
Filed April 28, 1931
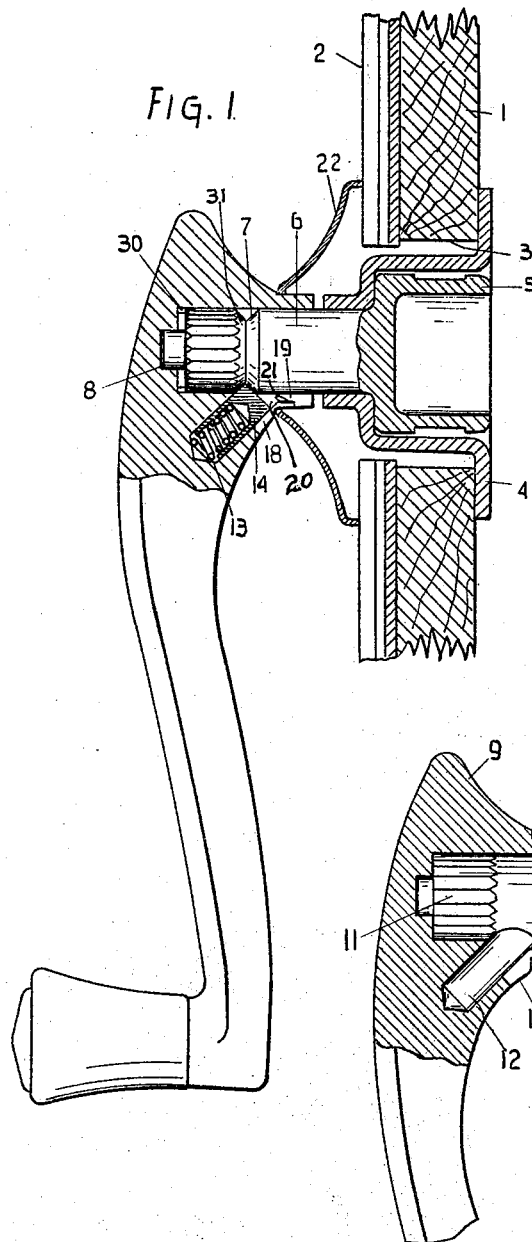
FIG. 1
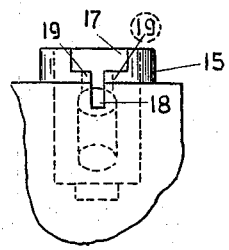
FIG. 4
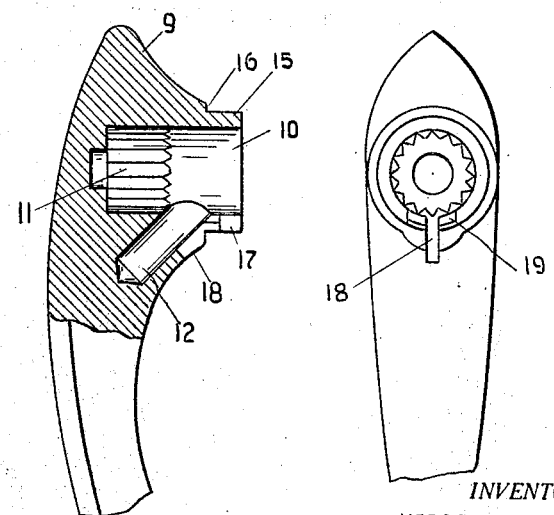
FIG. 3
FIG. 2
INVENTOR.
HERBERT C. FIELD
BY Barnes and Kisselle
ATTORNEYS.

Patented Sept. 13, 1932

1,877,289

UNITED STATES PATENT OFFICE

HERBERT C. FIELD, OF WINDSOR, ONTARIO, CANADA, ASSIGNOR TO TERNSTEDT MANUFACTURING COMPANY, OF DETROIT, MICHIGAN, A CORPORATION OF MICHIGAN

HANDLE ASSEMBLY

Application filed April 28, 1931. Serial No. 533,503.

This invention relates to a handle assembly.

It is the object of this invention to produce a handle assembly wherein the handle carries a spring loaded plunger which is adapted to snap into a groove in the spindle to retain the handle in assembled relation with the spindle.

It is the object of this invention to so position the spring pressed plunger that it not only serves as a means for retaining the handle on the spindle but likewise serves to yieldably push the handle axially of the spindle to hold it tightly against rattling.

It is a further object of this invention to produce a handle assembly in which the handle carries a spring loaded plunger which is permanently contained within the said handle and yet yieldable so that the handle can be easily pushed onto the spindle and retained thereon by the engagement of the plunger with a suitable recess in the spindle.

Another object of this invention is to make an attachment in which the handle hub size can be made as small as possible in relation to the practical minimum size of the handle spindle. It will be noted that the plunger and spring project into the handle proper, without enlarging the hub size. Another object is to make an assembly which does not require using the resilience of the trimming for uncovering the releasing means.

In the drawing:

Fig. 1 is a section showing the handle assembly.

Fig. 2 is a fragmentary section through the handle with the plunger removed.

Fig. 3 is a front elevation of the fragment of the handle shown in Fig. 2.

Fig. 4 is a fragmentary view looking down the handle toward the hub.

Referring more particularly to the drawing, there is shown a lock-board 1 which is covered with the usual trimming material 2. The lock board 1 is provided with the opening 3 for the reception of the window regulator clutch drum 4. For purposes of illustration the handle is shown assembled to the driving member 5 of a window regulator clutch which has the spindle portion 6. The complete window regulator clutch is not shown since the novelty of the invention resides in the means for retaining the handle in operative relation with the spindle.

The spindle 6 is provided with the annular V-shaped groove 7 and the serrated end portion 8. The end 8 of the spindle is chamfered as at 30 and 31. The handle 9 is provided with an opening 10 arranged to receive the spindle 6. The inner portion of the opening 10 is serrated as at 11 for interengagement with the serrated portion 8 of the spindle 6. The handle 9 is provided with the angularly positioned opening 12 which communicates with the opening 10. This opening 12 is adapted to receive the coil spring 13 and the plunger 14.

The handle 9 is provided with a hub portion 15 having an annular shoulder 16. The hub 15 is provided with recess 17 and a narrow slot 18 which communicates with the plunger opening 12, and a secondary recess 19. After the spring 13 and the associated plunger 14 have been inserted into the opening 12, the metal adjacent the inner end of the secondary recess 19 is staked or peened over as at 21 to permanently retain the plunger in the opening 12. The staked metal 21 permits the plunger 14 to project from the opening 12 a greater distance than is necessary for the plunger 14 to effectively seat itself in the annular groove 7. Hence, when the handle 9 is assembled to the spindle 6 there is preferably a small clearance as at 20 between the staked-over metal 21 and the plunger 14. This clearance will permit the plunger to adjust itself to take care of the commercial tolerances permitted in the handle assembly.

It is obvious that after the plunger and spring have been inserted in the opening 12 and the metal 21 peened over that the plunger is permanently positioned in the handle 9. Hence, the handle and associated plunger can be shipped without becoming separated. When it is desired to mount the handle 9 upon the spindle 6 the handle is positioned so that the spindle 6 engages in the opening 10. As the spindle 6 moves lengthwise in the opening 10, the plunger is depressed by contacting with the chamfer of the serrated portion 8 of the spindle and upon reaching the groove 7 the plunger 14 snaps into position. It will be noted that the opening 12 is positioned angularly relative to the longitudinal axis of the spindle 6. Hence, when in assembled position, the plunger serves not only to removably retain the handle upon the spindle but also exerts a yielding pressure upon the handle outwardly and axially of the spindle 6 to hold the spindle and handle in non-rattling engagement. The angle of the plunger also makes the assembly automatic.

It is readily seen that in the assembly of the handle to the spindle that no instrument is necessary to depress the plunger 14 but that it is automatically depressed by engagement with the end portion of the spindle. When it is desired to remove the handle from the spindle any suitable instrument, preferably hook-shaped, can be inserted into the opening 18 to engage the plunger 14 and retract the same to disengage it from the annular groove 7. When the plunger 14 is disengaged from the annular groove 7, the handle can be readily disengaged from the spindle 6. It will be noted that the escutcheon 22 is held between the annular shoulder 16 of the handle and the trimming 2 and further, that the hook-shaped instrument for retracting the plunger 14 can be inserted through the opening 18 to retract the plunger without in any wise moving the escutcheon 22.

It will be seen that the handle 9 can be mounted upon the spindle 6 and driven home with the serrations 11 interengaging the serrations 8. Owing to the fact that the annular groove 7 extends completely around the spindle 6 the plunger 14 will engage somewhere in the groove 7 regardless of the relative positions of the spindle 6 and the handle 9. In other words, with the spindle 6 in any given position, the workmen can snap the handle upon the spindle, if desired, without considering whether the handle is vertically or horizontally disposed, or disposed intermediate of the horizontal or vertical positions since the plunger 14 will always snap into the groove 7 which extends completely around the spindle 6.

I claim:

1. A handle assembly comprising in combination, a handle having an opening therein, a spindle arranged to engage the handle in the said opening, said spindle having a recess, a second opening in the said handle inclined relative to the longitudinal axis of the said spindle, and a spring pressed plunger carried in the said opening adapted to engage the spindle in the said recess to lock the said handle to the said spindle.

2. A handle assembly comprising in combination, a handle having an opening therein, a spindle having a recess adapted to engage the said handle in the said opening, a second opening in the said handle inclined relative to the axis of the first mentioned opening, a yieldable plunger carried by the said inclined opening and adapted to engage the said spindle in the said recess to retain the handle assembled to the said spindle, the said handle having a slot communicating with the opening for the spring pressed plunger whereby an instrument can be passed through the said slot to retract the said plunger from engagement in the recess in the said spindle to permit removal of the handle from the spindle.

3. A handle assembly comprising in combination, a handle having a serrated opening, a spindle having a serrated portion adapted to interengage the serrated opening in the said handle, and an annular groove, the said handle having another opening inclined relative to the axis of the said serrated opening, and a yieldable plunger carried by the said inclined opening arranged to engage the spindle in the said annular groove to hold the said handle in assembled relation with the said spindle.

4. A handle assembly comprising in combination, a handle having an opening therein, a spindle arranged to engage the said handle in the said opening in nonrotative relation and having a recess, the said handle having a second opening angularly disposed relative to the longitudinal axis of the said spindle, a spring pressed plunger mounted in the said opening, a portion of the metal adjacent the mouth of the said angularly disposed opening being displaced to permanently secure the said plunger within the said opening, said plunger being adapted to engage the spindle in the said recess to secure the handle to the spindle.

5. A handle assembly comprising in combination, a handle having a hub portion and a depending crank portion, the said hub portion having an opening therein, a spindle in the said opening, the said spindle having a recess, an opening in the depending crank portion of the said handle communicating with and inclined relative to the opening in the hub, a spring pressed plunger carried in the said inclined opening and adapted to engage the spindle in the recess to lock the handle to the said spindle.

In testimony whereof I affix my signature.

HERBERT C. FIELD.